(12) United States Patent
Chen

(10) Patent No.: US 12,084,551 B2
(45) Date of Patent: Sep. 10, 2024

(54) TEA FIBER/PHBV/PBAT TERNARY COMPOSITE AND PREPARATION METHOD AND APPLICATION THEREOF

(71) Applicant: ZENCE OBJECT TECHNOLOGY (SHENZHEN) CO., LTD., Shenzhen (CN)

(72) Inventor: Pengji Chen, Shenzhen (CN)

(73) Assignee: ZENCE OBJECT TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 18/136,242

(22) Filed: Apr. 18, 2023

(65) Prior Publication Data
US 2024/0018314 A1   Jan. 18, 2024

(30) Foreign Application Priority Data
Jul. 14, 2022   (CN) .......................... 202210823453.9

(51) Int. Cl.
| | |
|---|---|
| *C08L 67/03* | (2006.01) |
| *C08J 5/04* | (2006.01) |
| *C08K 5/14* | (2006.01) |
| *C08K 5/1539* | (2006.01) |

(52) U.S. Cl.
CPC ............. *C08J 5/045* (2013.01); *C08K 5/14* (2013.01); *C08K 5/1539* (2013.01); *C08L 67/03* (2013.01); *C08J 2367/03* (2013.01); *C08K 2201/013* (2013.01); *C08K 2201/014* (2013.01); *C08K 2201/018* (2013.01); *C08L 2201/06* (2013.01)

(58) Field of Classification Search
CPC ... C08L 67/03; C08L 2201/06; C08J 2367/03; C08J 5/045
See application file for complete search history.

(56) References Cited

U.S. PATENT DOCUMENTS

| | | | |
|---|---|---|---|
| 2013/0331493 A1* | 12/2013 | Yamamura .............. | C08L 67/04 524/400 |
| 2018/0127554 A1* | 5/2018 | Mohanty ................... | B29B 7/86 |

OTHER PUBLICATIONS

Sukthavorn et al; Journal of Material Cycles and Waste Management; 23; pp. 1964-1973 (Year: 2021).*

* cited by examiner

*Primary Examiner* — Karuna P Reddy
(74) *Attorney, Agent, or Firm* — Muncy, Geissler, Olds & Lowe, P.C.

(57) ABSTRACT

The invention provides a tea fiber/PHBV/PBAT ternary composite and its preparation method and application. Comprising the components in parts by weight, the composite contains 30-80 parts of a blending polymer of poly(butyleneadipate-co-terephthalate) (PBAT) and poly(3-hydroxybutyrate-co-3-hydroxyvalerate) (PHBV), 20-70 parts of tea powder, 1-19 parts of a plasticizer, 0.6-6 parts of an interface modifier, 3.3-10 parts of an auxiliary packing and 0.7-2 parts of a nucleating agent. The composite is environmental-friendly and cost-effective, exhibiting excellent mechanical properties such as hardness, compressive strength, and ductility. It can be used to manufacture environmental-friendly cups, tableware, compost bags, trash bags, shopping bags, electronic packaging bags, mulch films, 3D printing materials, foaming materials, and other plastic products.

7 Claims, No Drawings

TEA FIBER/PHBV/PBAT TERNARY COMPOSITE AND PREPARATION METHOD AND APPLICATION THEREOF

FIELD OF THE INVENTION

The invention relates to the technical field of papermaking, in particular to a tea fiber/PHBV/PBAT ternary composite and its preparation method and application.

BACKGROUND OF THE INVENTION

Plastic, renowned for its excellent performance, has become an essential part of people's daily lives. However, the heavy reliance on disposable plastic products made of traditional materials has led to serious environmental pollution, dubbed 'white pollution'. Poly(3-hydroxybutyrate-co-3-hydroxyvalerate) (PHBV) is a thermoplastic material synthesized by microorganisms used for carbon sources and energy storage. The PHBV, primarily synthesized from renewable natural materials, can be completely biodegraded to form carbon dioxide and water in the environment, thereby alleviating the oil crisis and positively addressing the issue of "white pollution". Nevertheless, it has the drawbacks of considerable brittleness and high cost. Poly (butyleneadipate-co-terephthalate) (PBAT) features flexible aliphatic segments, resulting in excellent toughness and a fracture growth rate of 600% or higher, as well as slow degradation rate. To ensure a certain degradation rate while attaining a balance between mechanical properties of rigidity and toughness, many hyperbranched polymer composites currently incorporate PHBV with PBAT. Nevertheless, the current range of hyperbranched polymer composites fails to meet the potential application needs due to the broad scope of polymer materials.

SUMMARY OF THE INVENTION

In order to address the issues present in the prior art, the invention provides a tea fiber/PHBV/PBAT ternary composite and its preparation method and application. The composite exhibits excellent material mechanical properties such as hardness, compressive strength, ductility and the like, as well as excellent bactericidal and bacteriostatic properties, oxygen permeability, UV resistance, and biological compatibility. The invention adopts the technical solution:

In the first aspect, the invention provides a tea fiber/PHBV/PBAT ternary composite, comprising the following components in parts by weight: 30-80 parts of a blending polymer of poly(butyleneadipate-co-terephthalate) (PBAT) and poly(3-hydroxybutyrate-co-3-hydroxyvalerate) (PHBV), 20-70 parts of tea powder, 1-19 parts of a plasticizer, 0.6-6 parts of an interface modifier, 3.3-10 parts of an auxiliary packing and 0.7-2 parts of a nucleating agent.

Further, the tea powder is prepared from any one or more of tea stems, tea leaves, tea tailings, tea residues after brewing, or defective products produced during a tea production process, through a sequence of grading, cooking, bleaching, cleaning, and drying in sequence.

Further, the tea powder is of a particle size between 30-300 meshes, with the water content not exceeding 2%.

Further, the mass ratio of the PBAT to the PHBV in the blending polymer of the two is 1:1.

Preferably, the blended polymer of PBAT and PHBV is further doped with an amount of graphene of 5% in mass.

Further, the plasticizer is one or more of polyethylene glycol, polyethylene wax, glycerol, polyol benzoate, terephthalate, tetraoctyl pyromellitate, trimellitate, epoxidized vegetable oil, citrate, and acetylcitrate.

Further, the interface modifier is one or more of a silane coupling agent, a titanate coupling agent, an aluminate coupling agent, a diphenylmethane diisocyanate/tin catalyst, a polydiphenylmethane diisocyanate, and a maleic anhydride/peroxide initiator.

Preferably, the interface modifier is the diphenylmethane diisocyanate/tin catalyst, wherein the tin catalyst is dibutyltin dilaurate, and the addition quantity of the tin catalyst is 4-10% of the diphenylmethane diisocyanate.

Preferably, the interface modifier is the maleic anhydride/peroxide initiator, wherein the peroxide initiator is benzoyl peroxide or diisopropylbenzene peroxide, and the addition quantity of the peroxide initiator is 10-50% of maleic anhydride.

Further, the auxiliary packing can be one of starch, talc powder, silicon dioxide, titanium dioxide, kaolin, calcium carbonate, and wollastonite.

Further, the nucleating agent can be one or two of sorbitol, sodium benzoate, calcium lactate, cellulose nanocrystals, chitin nanocrystals, and boron nitride.

Further, the composite also comprises a compatibilizer.

Preferably, the compatibilizer is polydiphenylmethane diisocyanate (PMDI).

In the second aspect, the invention provides a method for preparing a tea fiber/PHBV/PBAT ternary composite, which comprises the following steps:

After the components are prepared according to the specified raw materials, a uniform mixture was obtained by mixing them in a high-speed stirrer at a speed of 1000-2000 rpm. The mixture was then injected into an extruder, and melting blending and granulation were performed at a die temperature of 168-170° C. and a screw speed of 100-150 rpm. Finally, the particles were molded.

Optionally, a molding method comprises injection molding, extrusion molding, blow molding, or blow film molding.

In the third aspect, the invention provides an application of the tea fiber/PHBV/PBAT ternary composite to preparation of the plastic products.

Further, the plastic products comprise environmental-friendly cups, tableware, compost bags, rubbish bags, shopping bags, electronic packaging bags, mulch films, 3d printing materials, and foaming materials.

Compared with the prior art, the preparation method has the advantages that

The invention provides a fully biodegradable composite filled with the tea powder, and the composite adopts the main raw materials of biodegradable resins and the tea powder. Therefore, the composite has good environmental-friendly and economic characteristics, and has good mechanical properties, including hardness, compressive strength, ductility, and the like. The composite is simple in preparation method, high in production efficiency and low in preparation cost. The composite can be applied to the environmental-friendly cups, the tableware, the compost bags, the rubbish bags, the shopping bags, the electronic packaging bags, the mulch films, the 3d printing materials, foaming materials and other plastic products.

DETAILED DESCRIPTION OF THE EMBODIMENTS

In the description of the invention, it should be noted that, unless otherwise specified in the embodiments, conventional conditions or conditions recommended by the manufacturer shall be adopted. Reagents or instruments employed are of conventional type and can be procured from the market.

The present invention is further described in detail below in combination with embodiments, to help those skilled in the art have a more complete, accurate, and in-depth understanding of the inventive concept and the technical solution of the invention. The scope of protection of the invention includes, but is not limited to, the following embodiments. Any modifications made to the details and form of the technical solution of the invention, without departing from the spirit and scope of the application, fall within the scope of protection of the invention.

Embodiment 1

The embodiment provides a tea fiber/PHBV/PBAT ternary composite, and the tea fiber/PHBV/PBAT ternary composite comprises the following raw materials in parts by weight of 30 parts of a PBAT/PHBV blending polymer, 20 parts of tea powder, 6 parts of epoxidized soybean oil (ESO), 1 part of diphenylmethane diisocyanate (MDI), part of dibutyltin dilaurate, 5 parts of kaolin and 1 part of boron nitride. The weight average molecular weight of the PBAT/PHBV blending polymer is 500000, the mass ratio of the PBAT to the PHBV in the blending polymer of the two is 1:1, and the blended polymer of PBAT and PHBV is further doped with an amount of graphene of 5% in mass.

The preparation method of the tea fiber/PHBV/PBAT ternary composite involves the following steps:

Step 1: Preparing the tea powder: A process of mixing tea stems, tea leaves, tea tailings, tea residues after brewing, and defective products produced during a tea production process, grinding into powder, and then grading, cooking, bleaching, cleaning, and drying in sequence is employed to obtain the tea powder. In the grading process, collected tea materials are crushed and then screened through a mesh screen to obtain particles with an average diameter of 75-500 microns and an average length of millimeters. Subsequently, the coarse powder of 30-200 meshes is obtained by further grading with the mesh screen. After cooking and bleaching, the coarse powder enters a cleaning process, and is washed with water before being dried. Subsequently, drying is carried out at 85° C. until the water content of the tea powder is reduced to no more than 2%.

Step 2: Mixing the PBAT/PHBV blending polymer with the tea powder, the epoxidized soybean oil (ESO), the diphenylmethane diisocyanate (MDI), the dibutyltin dilaurate, the kaolin and the boron nitride at a speed of 1500 rpm in a high-speed stirrer for 6 minutes to produces a homogeneous mixture. This mixture is then injected into a twin-screw extruder for melting-blending and granulation at a die temperature of 169° C. and a screw speed of 100 rpm. Finally, the blended particles are injected into an injection molding machine for injection molding, a blow molding machine for blow molding, or a blow film molding machine for blow film molding.

The tensile strength of the composite in the embodiment is measured to be 24 MPa, the modulus is measured to be 1.1 GPa, the elongation at break is measured to be 4.7%, the impact strength is measured to be 7.6 KJ/m 2, and the heat deflection temperature (HDT) is measured to be 95° C. In addition, the composite prepared in the embodiment can be made into storage bottles, pen containers, and stationery boxes through injection molding, can be made into packaging bag products via blow molding, and can be made into film products via blow film molding.

Embodiment 2

The embodiment provides a tea fiber/PHBV/PBAT ternary composite, comprising, in parts by weight, 40 parts of a PBAT/PHBV blending polymer, 60 parts of tea powder, parts of dipropylene glycol dibenzoate (DP(3)B), 1 part of maleic anhydride (MA), part of benzoyl peroxide (BPO), 3.3 parts of silicon dioxide and 0.7 part of calcium lactate. The weight average molecular weight of the PBAT/PHBV blending polymer is 500000, the mass ratio of the PBAT to the PHBV in the blending polymer of the two is 1:1, and the blended polymer of PBAT and PHBV is further doped with an amount of graphene of 5% in mass.

The preparation method of the composite is the same as that described in Embodiment 1.

The tensile strength of the composite in the embodiment is measured to be 35 MPa, the modulus is measured to be 2.2 GPa, the elongation at break is measured to be 8.6%, the impact strength is measured to be 9.5 KJ/m 2, and the heat deflection temperature (HDT) is measured to be 87° C. In addition, the composite prepared in the embodiment can be made into stationery boxes, environmental-friendly cups, tableware, washing supplies, toothbrush handles, and combs via injection molding, and can be made into sheets for guardrails and floors via extrusion molding.

Embodiment 3

The embodiment provides a tea fiber/PHBV/PBAT ternary composite, comprising, in parts by weight, 80 parts of a PBAT/PHBV blending polymer, 70 parts of tea powder, 10 parts of tetraoctyl pyromellitate (TOPM), 6 parts of a silane coupling agent (KH-550), 5 parts of calcium carbonate, 1 part of boron nitride and 1 part of polydiphenylmethane diisocyanate (PMDI). The weight average molecular weight of the PBAT/PHBV blending polymer is 500000, the mass ratio of the PBAT to the PHBV in the blending polymer of the two is 1:1, and the blended polymer of PBAT and PHBV is further doped with an amount of graphene of 5% in mass.

The preparation method of the composite is the same as that described in Embodiment 1.

The tensile strength of the composite in the embodiment is measured to be 21 MPa, the modulus is measured to be 2.0 GPa, the elongation at break is measured to be 5.1%, the impact strength is measured to be 6.1 KJ/m 2, and the heat deflection temperature (HDT) is measured to be 92° C. In addition, the composite prepared in the embodiment can be made into storage bottles, stationery boxes, environmental-friendly cups, tableware, washing supplies, toothbrush handles, and combs via injection molding, and can be made into sheets for guardrails and floors via extrusion molding.

Embodiment 4

The embodiment provides a tea fiber/PHBV/PBAT ternary composite, comprising, in parts by weight, 40 parts of a PBAT/PHBV blending polymer, 60 parts of tea powder, 1 part of acetyl tributyl citrate (ATBC), 1 part of polydiphenylmethane diisocyanate (pMDI), 1 part of maleic anhydride (MA), 0.5 part of diisopropylbenzene peroxide, 10 parts of starch, 1 part of boron nitride and 1 part of chitin nanocrystals. The weight average molecular weight of the PBAT/PHBV blending polymer is 500000, the mass ratio of the PBAT to the PHBV in the blending polymer of the two is 1:1, and the blended polymer of PBAT and PHBV is further doped with an amount of graphene of 5% in mass.

The preparation method of the composite is the same as that described in Embodiment 1.

The tensile strength of the composite prepared in the embodiment is measured to be 25 MPa, the modulus is measured to be 1.4 GPa, the elongation at break is measured to be 6.2%, the impact strength is measured to be 6.0 KJ/m2, and the heat deflection temperature (HDT) is measured to be 90° C. In addition, the composite prepared in the embodiment can be made into storage bottles, stationery box products, environmental-friendly cups, tableware, washing supplies, toothbrush handles, and combs via injection molding, and can be made into sheets for guardrails and floors via extrusion molding.

The above embodiments are merely illustrative of several implementations of the invention, and the description thereof is more specific and detailed. However, these embodiments may not be construed as a limitation to the patentable scope of the invention. It should be pointed out that several variations and improvements may be made by those of ordinary skill in the art without departing from the conception of the invention, but such variations and improvements should fall within the protection scope of the invention. Therefore, the scope of protection of the invention patent should be subjected to the appended claims.

What is claimed is:

1. A tea fiber/PHBV/PBAT ternary composite, comprising the following components in parts by weight: 30-80 parts of a blending polymer of poly(butyleneadipate-co-terephthalate) (PBAT) and poly(3-hydroxybutyrate-co-3-hydroxyvalerate) (PHBV), 20-70 parts of tea powder, 1-19 parts of a plasticizer, 0.6-6 parts of an interface modifier, 3.3-10 parts of an auxiliary packing and 0.7-2 parts of a nucleating agent,
   wherein the interface modifier is diphenylmethane diisocyanate/tin catalyst, wherein the tin catalyst is dibutyltin dilaurate, and the addition quantity of the tin catalyst is 4-10% of the diphenylmethane diisocyanate.

2. The tea fiber/PHBV/PBAT ternary composite of claim 1, wherein tea powder is prepared from any one or any combination of tea stems, tea leaves, tea tailings, tea residues after brewing, or defective products produced during a tea production process, through a sequence of grading, cooking, bleaching, cleaning, and drying.

3. The tea fiber/PHBV/PBAT ternary composite of claim 1, wherein the plasticizer is one or more of polyethylene glycol, polyethylene wax, glycerol, polyol benzoate, terephthalate, tetraoctyl pyromellitate, trimellitate, epoxidized vegetable oil, citrate, and acetylcitrate.

4. The tea fiber/PHBV/PBAT ternary composite of claim 1, wherein the nucleating agent is one or two of sorbitol, sodium benzoate, calcium lactate, cellulose nanocrystals, chitin nanocrystals, and boron nitride.

5. The tea fiber/PHBV/PBAT ternary composite of claim 1, wherein the composite further comprises a compatibilizer.

6. A method for preparing a tea fiber/PHBV/PBAT ternary composite comprising steps of:

Step 1: mixing 30-80 parts of a blending polymer of poly(butyleneadipate-co-terephthalate) (PBAT) and poly(3-hydroxybutyrate-co-3-hydroxyvalerate) (PHBV), 20-70 parts of tea powder, 1-19 parts of a plasticizer, 0.6-6 parts of an interface modifier, 3.3-10 parts of an auxiliary packing and 0.7-2 parts of a nucleating agent in a high-speed stirrer at a speed of 1000-2000 rpm; wherein the interface modifier is diphenylmethane diisocyanate/tin catalyst, wherein the tin catalyst is dibutyltin dilaurate, and the addition quantity of the tin catalyst is 4-10% of the diphenylmethane diisocyanate Step 2: injecting the mixture in Step 1 into an extruder; and Step 3: performing melting, blending and granulation at temperature of 168-170° C. and a screw speed of 100-150 rpm.

7. The method for preparing a tea fiber/PHBV/PBAT ternary composite of claim 6, further comprising a step of: obtaining a molded product in Step 3 and manufacturing said molded product into plastic products.

* * * * *